United States Patent
Kang et al.

[11] Patent Number: 5,767,994
[45] Date of Patent: Jun. 16, 1998

[54] ORIENTATION FILM OF PHOTOPOLYMER IN A LIQUID CRYSTAL DISPLAY AND A METHOD OF FORMING THE FILM

[75] Inventors: Dae Sung Kang, Euiwang; Woo Sang Park; Hyun Ho Shin, both of Anyang; Soon Bum Kwon, Seoul, all of Rep. of Korea; Tatyana Ya. Marusii, Kiev-49, Ukraine; Yuriy A. Reznikov, Kiev-4, Ukraine; Anatoliy I. Khizhnyak, Kiev-34, Ukraine; Oleg V. Yaroshchuk, Kiev-118, Ukraine

[73] Assignee: Goldstar Co., Ltd., Seoul, Rep. of Korea

[21] Appl. No.: 464,115

[22] Filed: Jun. 1, 1995

Related U.S. Application Data

[63] Continuation of Ser. No. 180,240, Jan. 12, 1994, Pat. No. 5,464,669.

[30] Foreign Application Priority Data

Sep. 18, 1993 [KR] Rep. of Korea ............... 1993-18950

[51] Int. Cl.[6] .......................... H01L 29/04; H01L 31/036
[52] U.S. Cl. .................. 359/72; 349/135; 349/136; 349/123; 257/59
[58] Field of Search ........................... 349/123, 135, 349/136; 257/59, 72; 428/1

[56] References Cited

U.S. PATENT DOCUMENTS 5,464,669 11/1995 Kang et al. ................. 428/1

Primary Examiner—Wael Fahmy
Assistant Examiner—Fetsum Abraham
Attorney, Agent, or Firm—John P. White; Cooper & Dunham LLP

[57] ABSTRACT

A method for the formation of orientation film of a liquid crystal display. The method comprises the steps of forming polyvinyl-4-fluorocinnamate (hereinafter "PVCN-F") film on the surfaces of two opposite substrates and irradiating the two PVCN-F films formed with linearly polarized UV lights having different energy. The method in accordance with the present invention is capable of not only providing the pretilt angle to a fabricated LCD but also adjusting it by illuminating two substrates with linearly polarized UV beams having different energies from each other, respectively. In addition, the LCD fabricated by the method according to the present invention requires a much lower driving voltage, as compared with the conventional LCD having an orientation film of planar structure. Furthermore, phase distortion and light scattering phenomena do not occur in the LCD, so that display characteristics such as contrast and the like can be improved. The orientation film is formed of polyvinyl-4-fluorocinnamate which is highly resistant to heat, so that the LCD according to the present invention has an excellent thermostability.

11 Claims, 3 Drawing Sheets

ORIENTATION FILM OF PHOTOPOLYMER IN A LIQUID CRYSTAL DISPLAY AND A METHOD OF FORMING THE FILM

This application is a continuation of U.S. Ser. No. 08/180,240, filed Jan. 12, 1994, now allowed and patented, U.S. Pat. No. 5,464,665.

BACKGROUND OF THE INVENTION

The present invention relates in general to a method for the formation of orientation film of a liquid crystal display (hereinafter "LCD"), and more particularly to a method for forming an orientation film of photopolymer in an LCD, capable of providing a pretilt angle to the orientation film as well as adjusting it.

In a typical electrically switched LCD, a liquid crystal material is sealed between two glass or plastic plates that are provided with transparent conducting electrodes.

Hereinafter, a conventional LCD structure and method for fabricating the same will be discussed along with the problems generated therein with respect to the pretilt angle for better understanding of the background of the invention, referring to FIG. 1. There is a structure for a conventional LCD. As shown in FIG. 1, the inner surfaces of transparent glass substrates 1 and 1A are coated with transparent conducting electrodes 2 and 2A and are then covered with orientation films 3 and 3A, respectively. The inner surfaces are adhered to each other with a sealing material (not shown) so as to form a space, into which a liquid crystal material 4 is injected, the other surfaces of the glass substrates 1 and 1A being provided with polarizers 5 and 5A.

In such an LCD, it is required to align the liquid crystal injected between the two glass substrates in a uniform direction for a constant brightness and a high contrast ratio.

Several techniques for aligning the liquid crystal in a uniform direction are known. For example, there has been proposed such a method that an orientation film is deposited over a substrate which is subsequently subjected to the mechanical treatment of rubbing to form microgrooves, so that liquid crystal molecules may be aligned regularly on the entire surface of the orientation film therethrough. In this technique, a polyimide-type or polyamide-type polymeric material is widely used as a material for the orientation film. However, this technique employing the mechanical rubbing is disadvantageous in that the produced micro grooves inherently have defects, which cause random phase distortion and light scattering phenomena, thereby adversely affecting the operational characteristics of the display. In addition, static electricity generated during the mechanical rubbing of the polymer surface is believed to cause defects in active matrix displays. Furthermore, it is practically impossible to locally orient selected regions of the surface with the orientation of each different region.

In order to overcome the aforementioned disadvantages, a prepolymer, photosensitive material, has been proposed, which is polymerized by light to form the orientation film. The prepolymer includes polyvinyl-4-methoxycinnamic acid (hereinafter "PVCN-M") which is prepared by the reaction of polyvinyl alcohol (hereinafter "PVA") with 4-methoxy cinnamic acid. According to this technique, irradiation of linearly polarized ultraviolet (hereinafter "UV")light makes PVCN-M crosslinked, so that an oriented film of net structure is produced. This photopolymeric orientation film allows the liquid crystal molecules to be oriented in a preferred direction of planar structure. However, there exist problems in the orientation film formed by the photopolymerization of PVCN-M. For example, since the orientation film of PVCN-M has a bad thermostability, as ambient temperature becomes more than approximately 50° C., distortion emerges therein. In addition, the orientation film provides zero pretilt angle. As a result of zero pretilt, the electro-optical characteristics of the LCD based on the photosensitive material are inferior to those based on the rubbed polymer. For example, higher driving voltages and worse contrast are shown.

SUMMARY OF THE INVENTION

For solving the aforementioned problems, the present a need exists for a method for forming an orientation film, which is highly resistant to heat and which is capable of providing a suitable pretilt angle to an LCD.

Accordingly, in an aspect of the present invention, there is provided a method for forming a photopolymeric orientation film in an LCD, whereby the film can be highly resistant to heat.

According to another aspect of the present invention, there is provided a method for forming a photopolymeric orientation film in an LCD, whereby a pretilt angle can be so formed as to have a free value to some extent in the LCD.

According to a further aspect of the invention, there is provided a method for forming a photopolymeric orientation film in an LCD, whereby the LCD is improved greatly in phase distortion and light scattering phenomena.

The above objects are accomplished by providing a method which comprises the steps of forming polyvinyl-4-fluorocinnamate (hereinafter "PVCN-F") film on the surfaces of two opposite substrates and irradiating the two PVCN-F films formed with linearly polarized UV lights, each light having a different energy for each film.

The above and other objects and advantages of the present invention will become more apparent as the following description proceeds.

To the accomplishment of the foregoing and related ends, the invention, then, comprises the features hereinafter fully described in the specification and particularly pointed out in claims, the following description and the annexed drawing setting forth in detail a certain illustrative embodiment of the invention, this being indicative, however, of but one of the various ways in which the principles of the invention may be employed.

DETAILED DESCRIPTION OF THE PREFERRED EMBODIMENTS

Hereinafter, preferred embodiments of the invention will be described in detail.

The PVCN-F, used as a material for the photopolymeric orientation film, is prepared by reacting PVA with fluorocinnamic acid derivatives, wherein fluorine is substituted on a benzene ring of cinnamoyl molecule. It is necessary to dissolve PVCN-F in a solvent in order to deposit PVCN-F over the surface of glass substrate on which a transparent electrode and a thin film transistor are formed. For this, PVCN-F is dissolved in a mixture of 1,2-dichloroethane (hereinafter "DCE") and chlorobenzene (hereinafter "CB"). If a PVCN-F solution of low molecular weight is obtained, the weight ratio of DCE and CB may be 1:1. In the meanwhile, for preparing a solution of high molecular weight, the weight ration of DCE and CB may be 1:4. Since the concentration of the PVCN-F solution is dependent on the thickness of film which is to be coated, the concentration is determined by the film thickness. For example, if the film is to be coated in a thickness of approximately 500 nm, a PVCN-F solution with a concentration of 4 g/l may be used, in which 4 g of PVCN-F is dissolved in 1 l of a 1:4 mixture of DCE and CB.

After preparing the solution of PVCN-F in a mixture of DCE and CB, the solution is added dropwise with a pipette on the central portion of the glass substrate on which a transparent electrode and a thin film transistor are formed. Subsequently, an orientation film is formed on the substrate, using a spin coating instrument. The spin coating process is carried out for 20 to 30 seconds in a rotational speed of 3 to $5 \times 10^3$ rpm. Following the spin coating, the resulting substrate is subjected to the treatment of prebaking at approximately 50° C. for approximately 30 minutes.

In accordance with the present invention, illumination of linearly polarized UV light causes the deposited polymer to be crosslinked, providing a pretilt angle thereto, as described later. The pretilt angle formed in an LCD may be adjusted by irradiating two films deposited on glass substrates of the LCD with two UV lights of different energy, respectively.

The two opposite glass substrates are attached to each other in a conventional method, and then a liquid crystal material is injected therebetween, utilizing capillary action.

Figure 2:
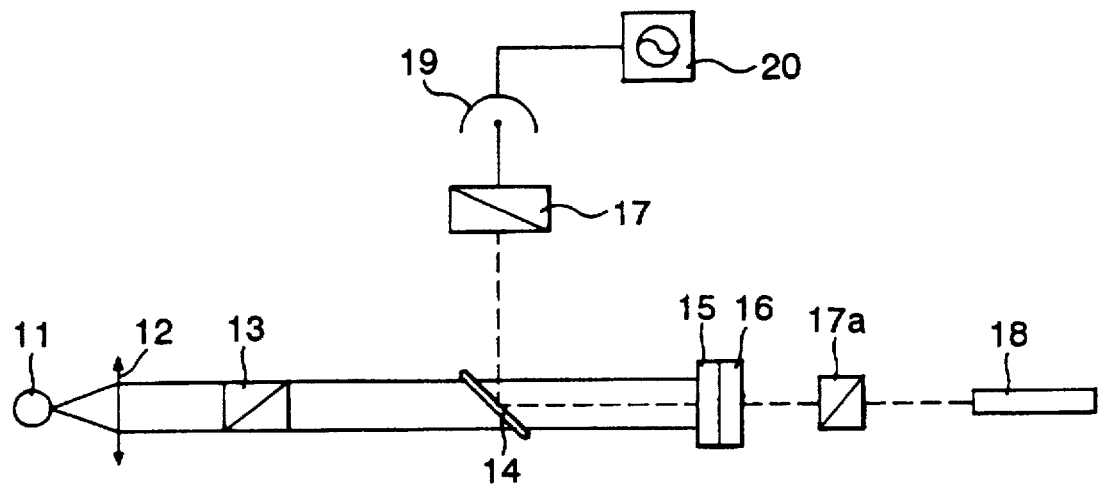
FIG. 2 is a schematic illustration of an experimental setup for the illumination of linearly polarized UV light and for the measurement of birefringence.

The detailed description will be given next for the film illumination and birefringence measurement with reference to FIG. 2. There is a schematic view illustrating an experimental setup for illuminating linearly polarized UV light to the deposited prepolymer material and for measuring birefringence. As shown in FIG. 2, UV light generated from a mercury lamp 11 with an average power of approximately 250 to 500 W is linearly polarized through a lens 12 and a prism 13. The linearly polarized UV light obtained, enters a splitting mirror 14 which passes one direction of the light therethrough and reflects other directions, so that the passed light illuminates the photosensitive prepolymer material (PVCN-F) 15 coated on a glass substrate 16. As a result of illumination, the initially isotropic polymer becomes an anisotropic polymer.

An induced birefringence can be detected by a measuring system including the splitting mirror 14, polarizers 17 and 17A, a helium-neon laser 18, a photodiode 19 and an oscillograph 20. The illumination state can be monitored by measuring the birefringence since the anisotropy is represented as birefringence.

Figure 3:
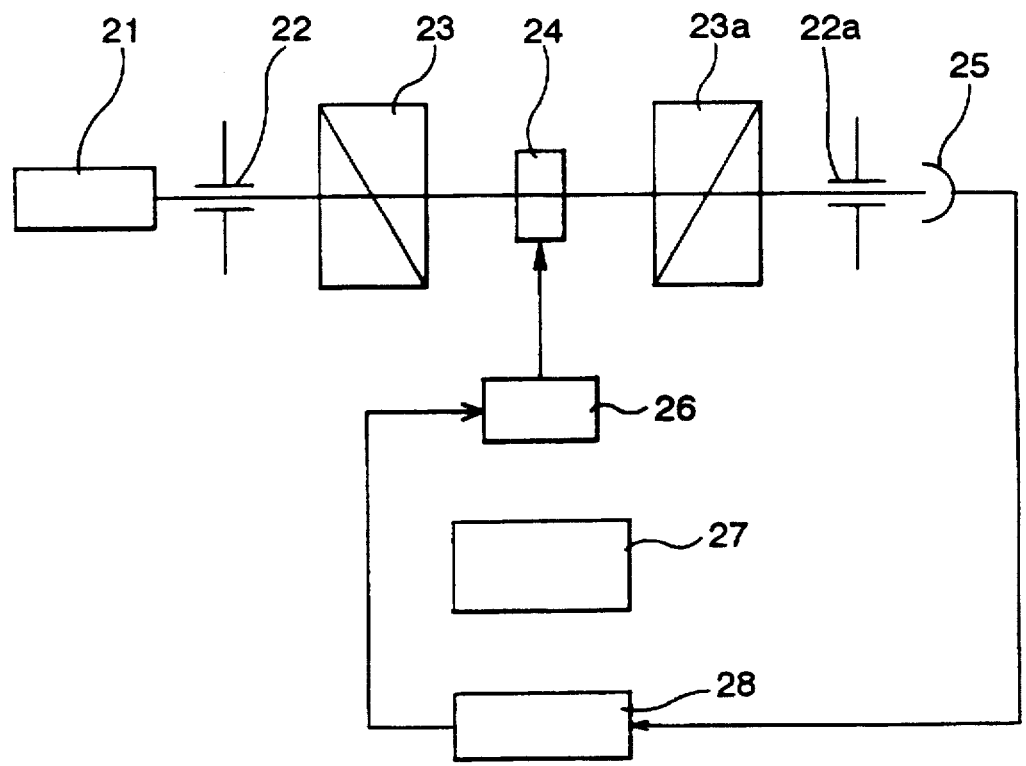
FIG. 3 is a schematic illustration of an experimental setup for pretilt angle measurements.

Turning now to FIG. 3, there is schematic view illustrating an experimental setup for pretilt angle measurements. As shown in FIG. 3, a beam generated from helium-neon laser 21 is incident on an LCD cell 24 rotating between polarizers 23 and 23A which are transverse to the path of the beam. The cell is adjusted on a table equipped with a step motor 26. The intensity of the beam I passed through the diaphragm 22 is recorded as a function of the angle between the axis normal to the cell and wave vector K of a laser beam. As the beam further passes through another diaphragm 22A and enters a light-receiving device, photodiode 25, the value of intensity is displayed in a monitor 27 provided to a computer which receives a signal relating to information for the intensity through the photodiode 25. The pretilt angle was determined by the position of symmetry axis of the $\tau(\phi)$ curve, represented as the following formula: $\theta \sim \phi_s/(n_e+n^o)$, wherein $\phi_s$ is an angle corresponding to the symmetry axis, and $n_e$ and $n_o$ are the LC refractive indices for extraordinary and ordinary waves, respectively.

Figure 4:
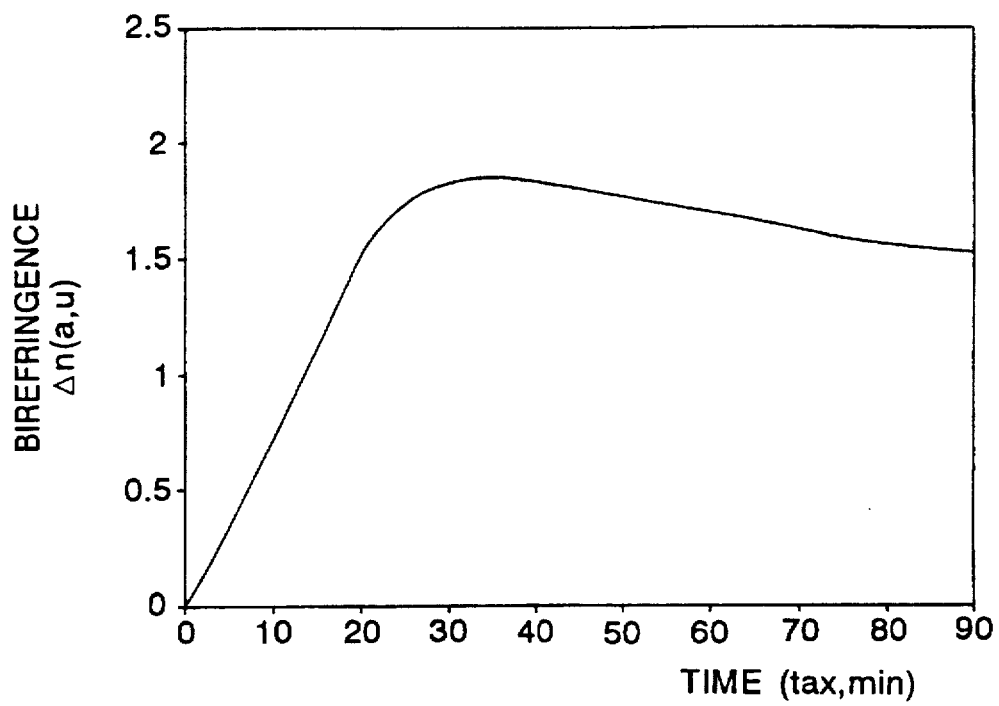
FIG. 4 is a curve illustrating the relation between an induced birefringence in a PVCN-F film and a UV illumination time, according to the invention.

Referring now to FIG. 4, there is a graph illustrating the relation between the birefringence of the photopolymer and illumination time, according to the present invention. From the drawing, for example it is apparent that when the intensity of linearly polarized UV beam is constant, the birefringence is almost proportional to the illumination time until 40 minutes.

EXAMPLE 1

Figure 1:
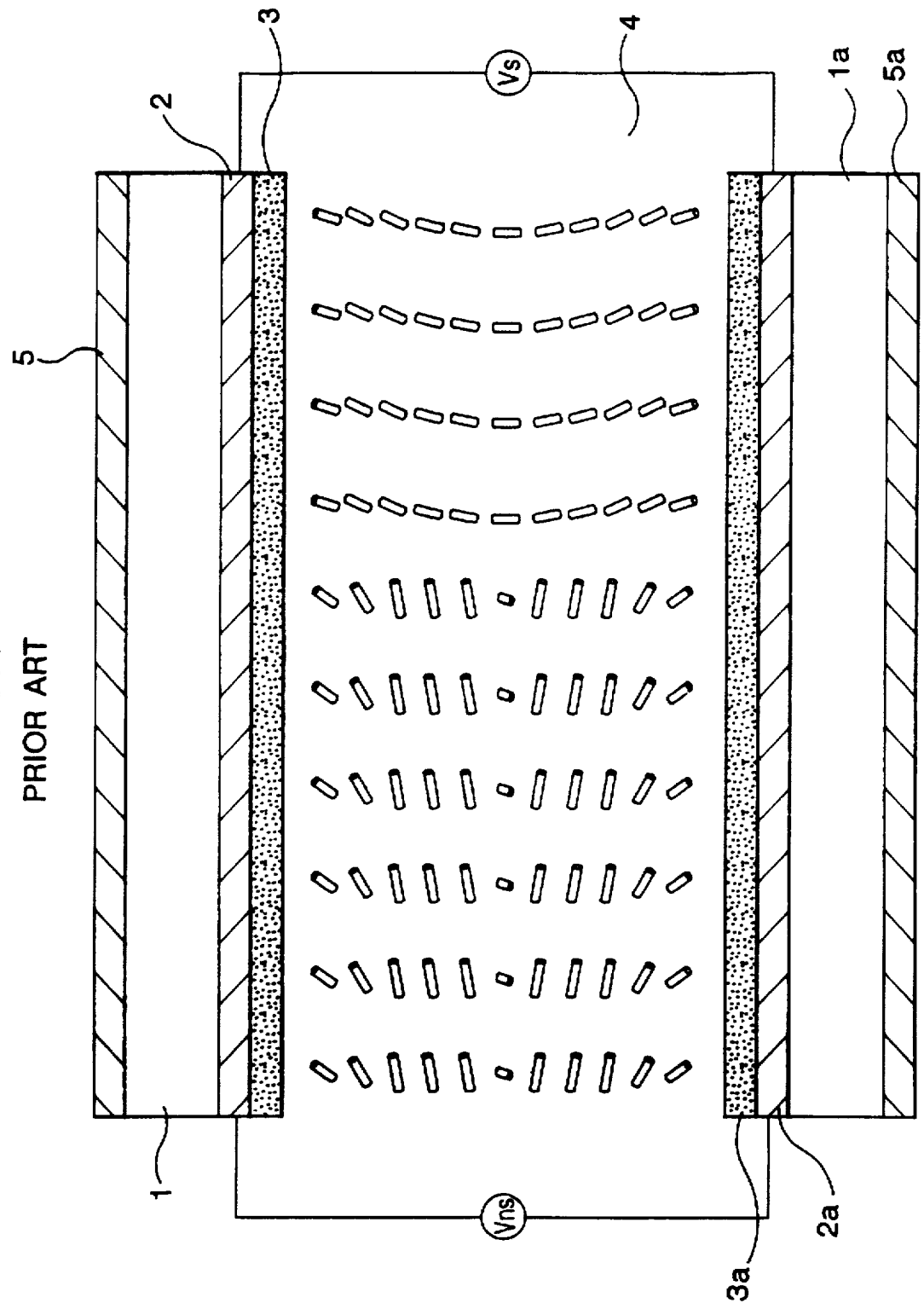
FIG. 1 is a schematic sectional elevation view showing a conventional LCD structure.

A first PVCN-F film coated on a glass substrate was placed in the instrument shown in FIG. 1, and was exposed to linearly polarized UV light having an intensity of approximately 25 mW for 10 minutes. The illuminated area was approximately $1 \times 1.5$ cm$^2$. A second PVCN-F film on another glass substrate was also exposed to the same beam for 20 minutes (illumination time difference $\Delta t_{ex}=10$ minutes).

The two resulting glass substrates were attached to each other and a liquid crystal material was injected in a conventional manner to fabricated an LCD. Using the optical equipment shown in FIG. 2, the pretilt angle of the fabricate LCD was measured, as explained above.

The result is given as shown in the following Table 1 and is plotted in FIG. 5.

EXAMPLE 2

Two PVCN-F films were exposed in a manner similar to that of Example 1 except that the illumination times for the two films was 10 minutes, respectively (illumination time difference $\Delta t_{ex}=0$ minute). The resulting glass substrates were attached to each other, followed by the injection of liquid crystal therebetween, so as to fabricate an LCD. The pretilt angle of the fabricated LCD was measured.

The result is given as shown in the following Table 1 and is plotted in FIG. 5.

EXAMPLE 3

An LCD was prepared in a manner similar to that of Example 1 except that the first PVCN-F polymer was exposed for 10 minutes and the second PVCN-F polymer was exposed for 30 minutes (illumination time difference $\Delta t_{ex}=20$ minutes).

The pretilt angle of the fabricated LCD was measured.

The result is given as shown in the following Table 1 and is plotted in FIG. 5.

EXAMPLE 4

An LCD was prepared in a manner similar to that of Example 1 except that the illumination times for the first and the second PVCN-F polymers were 90 and 150 minutes, respectively (illumination time difference $\Delta t_{ex}=60$ minutes).

The pretilt angle of the prepared LCD was measured.

The result is given as shown in the following Table 1 and is plotted in FIG. 5.

EXAMPLE 5

An LCD was fabricated in a manner similar to that of Example 1 except that the illumination times for the first and the second PVCN-F polymers were 10 and 90 minutes, respectively (illumination time difference $\Delta t_{ex}=80$ minutes).

The pretilt angle of the fabricated LCD was measured.

The result is given as shown in the following Table 1 and is plotted in FIG. 5.

EXAMPLE 6

An LCD was fabricated in a manner similar to that of Example 1 except that the first and the second PVCN-F polymers were exposed for 10 and 70 minutes, respectively (illumination time difference $\Delta t_{ex}=60$ minutes).

The pretilt angle of the fabricated LCD was measured.

The result is given as shown in the following Table 1 and is plotted in FIG. 5.

TABLE 1

| Example No. | Pretilt Angle (°) | Illum. Time (min) First | Illum. Time (min) Second | Time Difference (min) |
| --- | --- | --- | --- | --- |
| 1 | 10 | 10 | 20 | 10 |
| 2 | 0 | 10 | 10 | 0 |
| 3 | 13.5 | 10 | 30 | 20 |
| 4 | 0 | 90 | 150 | 60 |
| 5 | 18 | 10 | 90 | 80 |

Figure 5:
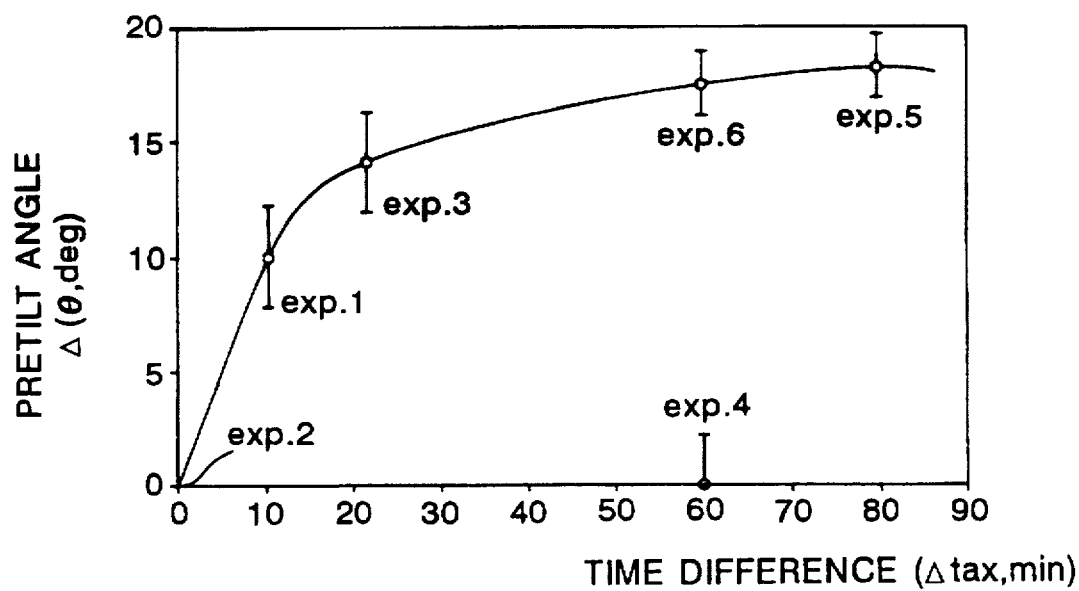
FIG. 5 is a plot illustrating the relation between a pretilt angle and an illumination time difference on the basis of the results of examples according to the invention.

Referring to FIG. 5, there is illustrated the relation between the pretilt angle and the time difference illuminating the first and second substrates with the light. As shown in the figure, the pretilt angle is proportional to the illumination time difference and the gradient is large within 30 minutes of the time difference whereas it is small when the difference is greater than 30 minutes.

From the Examples, it is recognized that the pretilt angle θ becomes greater as the time difference is larger under the constant intensity of light. However, this is effective within 90 minutes of the illumination time. In other words, when the film is exposed for a time longer than 90 minutes, the pretilt angle is not obtained even though the time difference is very large.

In the meanwhile, it should be noted that similar or the same results as illustrated above are obtained when the intensities of linearly polarized incident UV light are different from one another under a constant illumination time. That is, since, as proposed in present invention, the pretilt angle is dependent on the difference of the illumination energy which is, in turn, proportional to both the intensity of light and the illumination time (intensity x time), the stronger intensity of, the incident beam which is above the critical intensity allows the pretilt angle to be greater when the illumination time is constant.

As explained above, the method in accordance with the present invention is capable of not only providing the pretilt angle to a fabricated LCD but also adjusting it by illuminating two substrates with linearly polarized UV beams having different energies each other, respectively. In addition, the LCD fabricated by the method according to the present invention requires a greatly low driving voltage, as compared with the LCD as an orientation material and having an orientation film of planar structure. Furthermore, phase distortion and light scattering phenomena do not occur in the LCD, so that display characteristics such as contrast and the like can be improved.

Whilst the present invention has been described with reference to certain preferred embodiments and examples, it will be appreciated by those skilled in the art that numerous variations and modifications are possible without departing from the spirit or scope of the invention as broadly described.

What is claimed is:

1. A method for fabricating a liquid crystal display device, comprising the steps of forming at least one photosensitive orientation layer over a substrate; and irradiating said orientation layer with a light beam such that the resulting liquid crystal display device has a pretilt angle.

2. The method for fabricating a liquid crystal display device of claim 1, wherein said photosensitive orientation layer includes a polyvinyl-4-fluorocinnamate polymer.

3. The method for fabricating a liquid crystal display device of claim 1, wherein said irradiating step includes irradiating the photosensitive orientation layer with a linearly polarized ultraviolet light.

4. A method for fabricating a liquid crystal display device, comprising the steps of:

forming a first photosensitive orientation layer adjacent a first substrate;

irradiating said first photosensitive orientation layer with a light beam of a first amount;

forming a second photosensitive orientation layer adjacent a second substrate spaced from the first substrate; and irradiating said second photosensitive orientation layer with a light beam of a second amount different from the first amount such that the resulting liquid crystal display device has a pretilt angle.

5. The method for fabricating a liquid crystal display device of claim 4, wherein said first and second orientation layers each include a polyvinyl-4-fluorocinnamate polymer.

6. The method for fabricating a liquid crystal display device of claim 4, wherein said irradiating step includes irradiating the first orientation layer step and said irradiating the second orientation layer step each include irradiating the photosensitive orientation layer with a linearly polarized ultraviolet light.

7. The method for fabricating a liquid crystal display device of claim 4, wherein said irradiating the first orientation layer includes irradiating said first orientation layer with a light beam of a constant intensity for a fist time duration and wherein said irradiating the second orientation layer step includes irradiating said second orientation layer with said light beam of a constant intensity for a second time duration different from the first time duration.

8. A liquid crystal device, comprising:

a first and a second substrate spaced from one another;

a liquid crystal layer between said first and second substrate;

a first photosensitive orientation layer adjacent the first substrate; and a second photosensitive orientation layer adjacent the second substrate, at least one of said first and second orientation layers having a predetermined non-zero birefringence.

9. The liquid crystal display device of claim 8, wherein said first and second orientation layers each include a polyvinyl-4-fluorocinnamate polymer.

10. A liquid crystal device, comprising:
- a first and a second substrate spaced from one another;
- a liquid crystal layer between said first and second substrates;
- a first photosensitive orientation layer adjacent the first substrate; and
- a second photosensitive orientation layer adjacent the second substrate, each of said first and second substrates having a predetermined non-zero birefringence different from the other.

11. The liquid crystal display device of claim 10, wherein said first and second orientation layers each include a polyvinyl-4-fluorocinnamate polymer.

* * * * *